(12) United States Patent
Hwang et al.

(10) Patent No.: US 12,432,590 B2
(45) Date of Patent: Sep. 30, 2025

(54) SCHEDULING RESTRICTION AND SMTC CONFIGURATION FOR HIGH FREQUENCY RANGE

(71) Applicant: LG ELECTRONICS INC., Seoul (KR)

(72) Inventors: Jinyup Hwang, Seoul (KR); Yoonoh Yang, Seoul (KR); Sangwook Lee, Seoul (KR); Suhwan Lim, Seoul (KR); Jaehyuk Jang, Seoul (KR); Jinwoong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 387 days.

(21) Appl. No.: 17/959,889

(22) Filed: Oct. 4, 2022

(65) Prior Publication Data

US 2023/0217282 A1    Jul. 6, 2023

(30) Foreign Application Priority Data

Jan. 5, 2022    (KR) .................. 10-2022-0001795

(51) Int. Cl.
*H04W 24/08*    (2009.01)

(52) U.S. Cl.
CPC .................. *H04W 24/08* (2013.01)

(58) Field of Classification Search
CPC .................. H04W 24/08; H04W 56/00
See application file for complete search history.

(56) References Cited

U.S. PATENT DOCUMENTS

2021/0084511 A1    3/2021  Harada
2021/0345275 A1*  11/2021  Kong ................ H04W 56/0015
2023/0123943 A1*   4/2023  Yokokawa ............ H04W 88/02
                                                            370/252

FOREIGN PATENT DOCUMENTS

| CN | 111727638 A | 9/2020 | |
|----|----|----|----|
| KR | 1020190018659 A | 2/2019 | |
| KR | 1020200033744 A | 3/2020 | |
| WO | 2020032508 A1 | 2/2020 | |
| WO | 2021149256 A1 | 7/2021 | |
| WO | 2021199346 A1 | 10/2021 | |
| WO | 2021215884 A1 | 10/2021 | |
| WO | WO-2021222820 A1 * | 11/2021 | ............ H04W 24/10 |
| WO | 2021237687 A1 | 12/2021 | |

OTHER PUBLICATIONS

ETSI TS 138 133 V16.9.0 (Dec. 2021) Technical Specification; 5G; NR; Requirement for Support of Radio Resource Management (3GPP TS 38.133 version 16.9.0 Release 16) See Section 3.6. (2910 Pages).
ETSI TS 138 131 V16.6.0 (Oct. 2021) Technical Specification; 5G; NR; Radio Resource Control (RRC)Protocol Specification (3GPP TS 38.331 version 16.6.0 Release 16) (10 Pages).
VIVO (2021), "Discussion on measurement gap interruption for 52.6-71GHz," 3GPP TSG-RAN4 WG4 Meeting #100-e, Electronic Meeting, Aug. 15-27, 2021, R4-2112562, pp. 1-4.

* cited by examiner

*Primary Examiner* — Brian P Cox
(74) *Attorney, Agent, or Firm* — BRYAN CAVE LEIGHTON PAISNER LLP

(57) ABSTRACT

There is provided a method for performing communication. The method performed by a UE and comprising: receiving measurement configuration information from a base station; and performing measurement based on the measurement configuration information; and transmitting measurement report based on the measurement.

10 Claims, 16 Drawing Sheets

FIG. 6

| DRX cycle | $T_{PSS/SSS\_sync\_intra}$ |
|---|---|
| No DRX | max(600ms, ceil($M_{pss/sss\_sync\_w/o\_gaps}$ × $K_p$ × $K_{layer1\_measurement}$) × SMTC period)[Note 1] × $CSSF_{intra}$ |
| DRX cycle≤320ms | max(600ms, ceil(1.5 × $M_{pss/sss\_sync\_w/o\_gaps}$ × $K_p$ × $K_{layer1\_measurement}$) × max(SMTC period,DRX cycle)) × $CSSF_{intra}$ |
| DRX cycle>320ms | ceil($M_{pss/sss\_sync\_w/o\_gaps}$ × $K_p$ × $K_{layer1\_measurement}$) × DRX cycle × $CSSF_{intra}$ |

FIG. 7

| DRX cycle | $T_{SSB\_measurement\_period\_intra}$ |
|---|---|
| No DRX | $\max(400ms, \text{ceil}(M_{meas\_period\_w/o\_gaps} \times K_p \times K_{layer1\_measurement}) \times \text{SMTC period})^{Note\ 1} \times CSSF_{intra}$ |
| DRX cycle≤320ms | $\max(400ms, \text{ceil}(1.5 \times M_{meas\_period\_w/o\_gaps} \times K_p \times K_{layer1\_measurement}) \times \max(\text{SMTC period}, \text{DRX cycle})) \times CSSF_{intra}$ |
| DRX cycle>320ms | $\text{ceil}(M_{meas\_period\_w/o\_gaps} \times K_p \times K_{layer1\_measurement}) \times \text{DRX cycle} \times CSSF_{intra}$ |

FIG. 8

| DRX cycle | $T_{SSB\_time\_index\_inter}$ |
|---|---|
| No DRX | Max(200ms, Ceil(Kgap × $M_{SSB\_index\_inter}$) × Max(MGRP, SMTC period)) × $CSSF_{inter}$ |
| DRX cycle≤320ms | ax(200ms, Ceil(1.5 * Kgap × $M_{SSB\_index\_inter}$) × Max(MGRP, SMTC period, DRX cycle)) × $CSSF_{inter}$ |
| DRX cycle>320ms | Ceil(Kgap × $M_{SSB\_index\_inter}$) × DRX cycle × $CSSF_{inter}$ |

SCHEDULING RESTRICTION AND SMTC CONFIGURATION FOR HIGH FREQUENCY RANGE

CROSS-REFERENCE TO RELATED APPLICATIONS

Pursuant to 35 U.S.C. § 119(a), this application claims the benefit of Korean Patent Application No. 10-2022-0001795 filed on Jan. 5, 2022 the content of which is all hereby incorporated by reference herein in their entirety.

TECHNICAL FIELD

The present disclosure relates to mobile communication.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

User Equipment (UE) may perform measurement based on Synchronization Signal Block (SSB) (or also refers to SS/PBCH block) transmitted by serving cell and/or neighbor cell. The UE may perform measurement during time window based on SMTC.

In Subcarrier Spacing (SCS) above 480 kHz, the symbol length is smaller than symbol length of SCS smaller than 480 kHz. For example, operating bands of Frequency Range (FR) 2-2 in NR supports SCS of 480 kHz, and 960 kHz. However, conventionally, small symbol length due to SCS above 480 kHz was not considered for performing measurement.

For example, even in the synchronous state, the serving signal received by the UE and the signal of the neighbor cell may deviate by a certain symbol. The UE may measure SSB-based RSRP according to the prior art. In this case, when the SMTC window is configured, the symbol length according to the SCS of 480 kHz or higher is not considered. Due to this, a problem may occur that the SSB of the neighbor cell is not partially included in the SMTC window, and may affect the accuracy of the RSRP measured by the UE.

SUMMARY

Accordingly, a disclosure of the present specification has been made in an effort to solve the aforementioned problem.

In accordance with an embodiment of the present disclosure, a disclosure of the present specification provides a method for performing communication. The method is performed by a UE and comprising: receiving measurement configuration information from a base station; and performing measurement based on the measurement configuration information; and transmitting measurement report based on the measurement.

In accordance with an embodiment of the present disclosure, a disclosure of the present specification provides a UE in a wireless communication system, the UE comprising: at least one transceiver; at least one processor; and at least one computer memory operably connectable to the at least one processor and storing instructions that, based on being executed by the at least one processor, perform operations comprising: receiving measurement configuration information from a base station; and performing measurement based on the measurement configuration information; and transmitting measurement report based on the measurement.

In accordance with an embodiment of the present disclosure, a disclosure of the present specification provides wireless communication device operating in a wireless communication system, the wireless communication device comprising: obtaining measurement configuration information including information related to SMTC window; performing measurement based on the measurement configuration information; and generating measurement report based on the measurement.

In accordance with an embodiment of the present disclosure, a disclosure of the present specification provides CRM storing instructions that, based on being executed by at least one processor, perform operations comprising: obtaining measurement configuration information including information related to SMTC window; performing measurement based on the measurement configuration information; and generating measurement report based on the measurement.

According to a disclosure of the present disclosure, the above problem of the related art is solved.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

FIG. 6 shows an example of time period for detecting synchronization signal.

FIG. 7 shows an example of measurement period.

FIG. 8 shows an example of time period for detecting time index.

DESCRIPTION OF EXEMPLARY EMBODIMENTS

Figure 1:
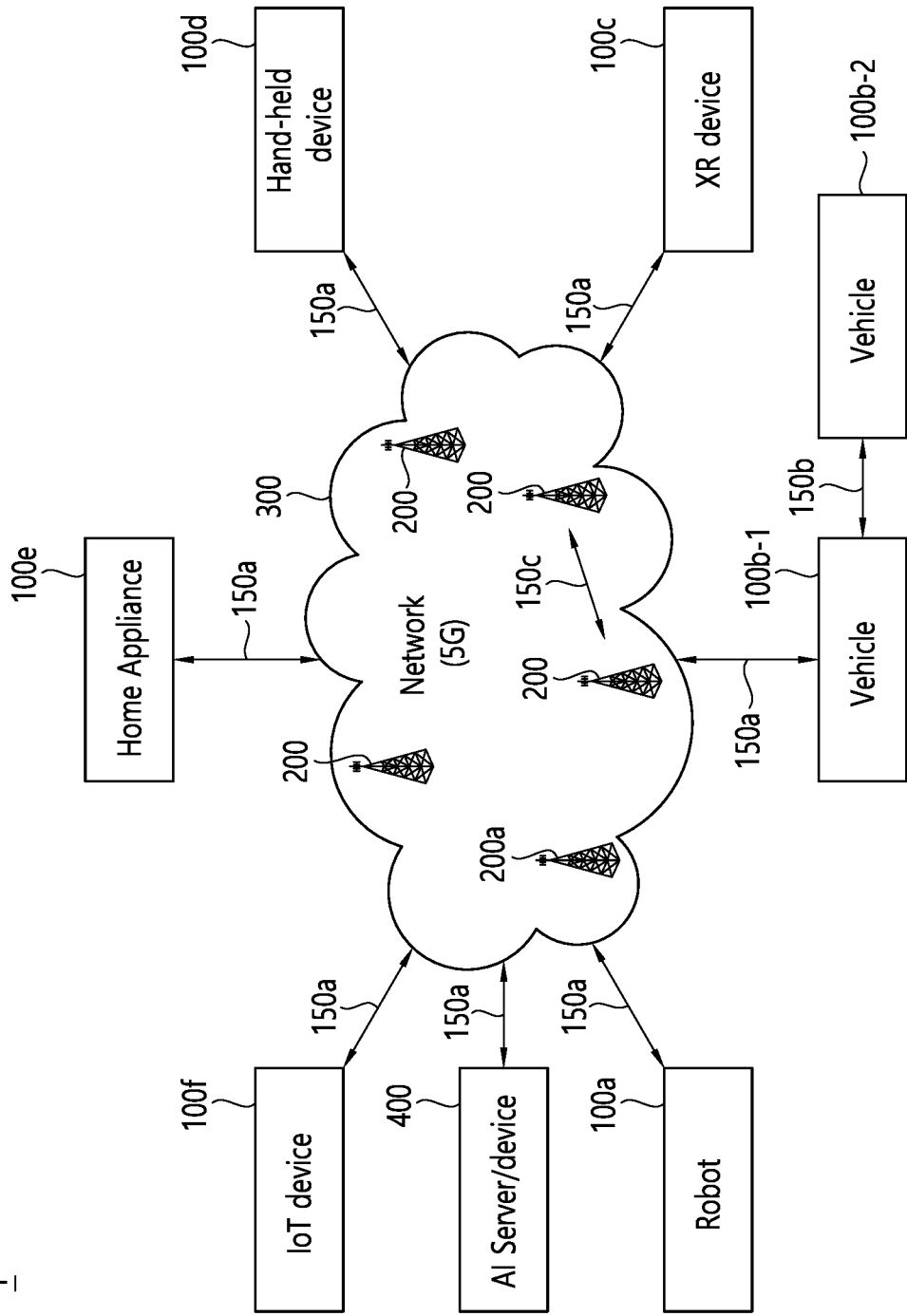
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

Although user equipment (UE) is illustrated in the accompanying drawings by way of example, the illustrated UE may be referred to as a terminal, mobile equipment (ME), and the like. In addition, the UE may be a portable device such as a notebook computer, a mobile phone, a PDA, a smart phone, a multimedia device, or the like, or may be a non-portable device such as a PC or a vehicle-mounted device.

Hereinafter, the UE is used as an example of a wireless communication device (or a wireless device, or a wireless apparatus) capable of wireless communication. An operation performed by the UE may be performed by a wireless communication device. A wireless communication device may also be referred to as a wireless device, a wireless device, or the like.

A base station, a term used below, generally refers to a fixed station that communicates with a wireless device. The base station may be reffered to as another term such as an evolved-NodeB (eNodeB), an evolved-NodeB (eNB), a BTS (Base Transceiver System), an access point (Access Point), gNB (Next generation NodeB), etc.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW). FR2 may include FR 2-1 and FR 2-2 as shown in Examples of Table 1 and Table 2.

TABLE 1

| Frequency Range designation | | Corresponding frequency range | Subcarrier Spacing |
|---|---|---|---|
| FR1 | | 450 MHz-6000 MHz | 15, 30, 60 kHz |
| FR2 | FR2-1 | 24250 MHz-52600 MHz | 60, 120, 240 kHz |
| | FR2-2 | 57000 MHz-71000 MHz | 120, 480, 960 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | | Corresponding frequency range | Subcarrier Spacing |
|---|---|---|---|
| FR1 | | 410 MHz-7125 MHz | 15, 30, 60 kHz |
| FR2 | FR2-1 | 24250 MHz-52600 MHz | 60, 120, 240 kHz |
| | FR2-2 | 57000 MHz-71000 MHz | 120, 480, 960 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
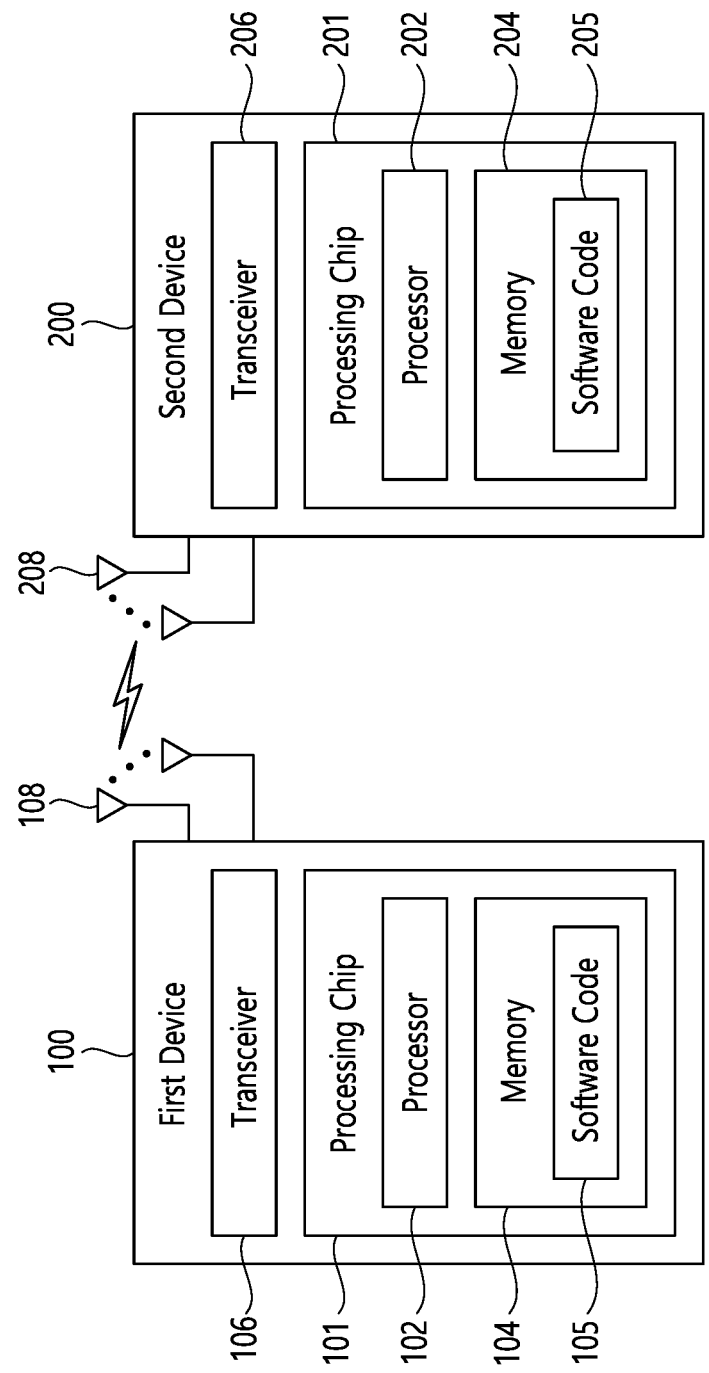
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
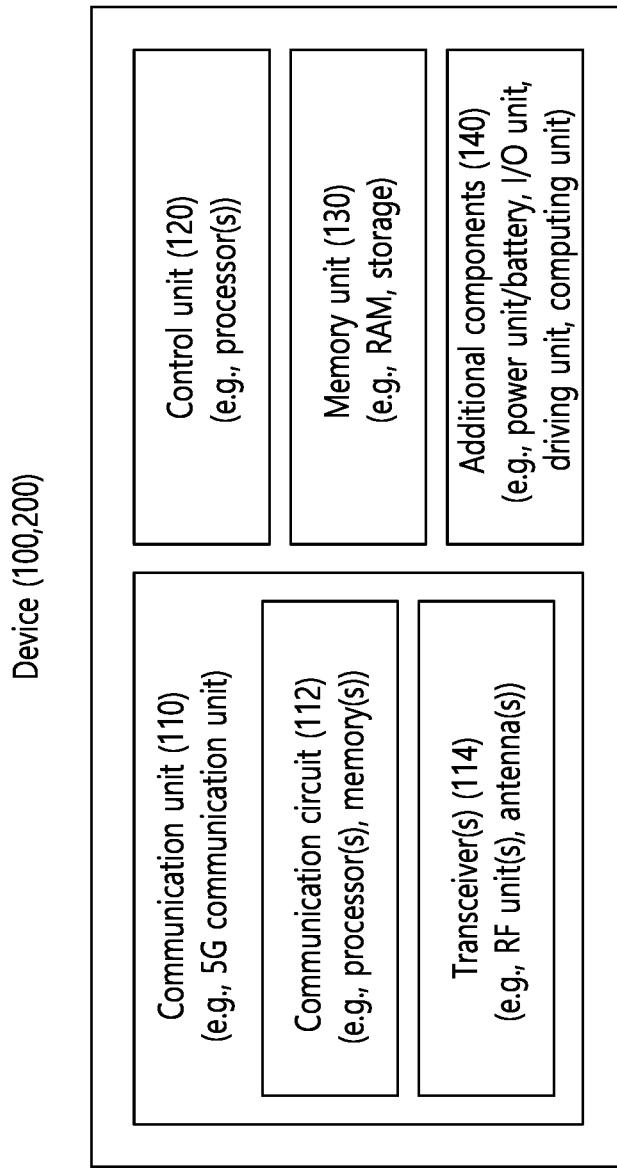
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

<SS Block in NR>

In the 5G NR, information required for a UE to perform an initial access, that is, a Physical Broadcast Channel (PBCH) including a Master Information Block (MIB) and a synchronization signal (SS) (including PSS and SSS) are defined as an SS block. In addition, a plurality of SS blocks may be grouped and defined as an SS burst, and a plurality of SS bursts may be grouped and defined as an SS burst set. It is assumed that each SS block is beamformed in a particular direction, and various SS blocks existing in an SS burst set are designed to support UEs existing in different directions.

Figure 4:
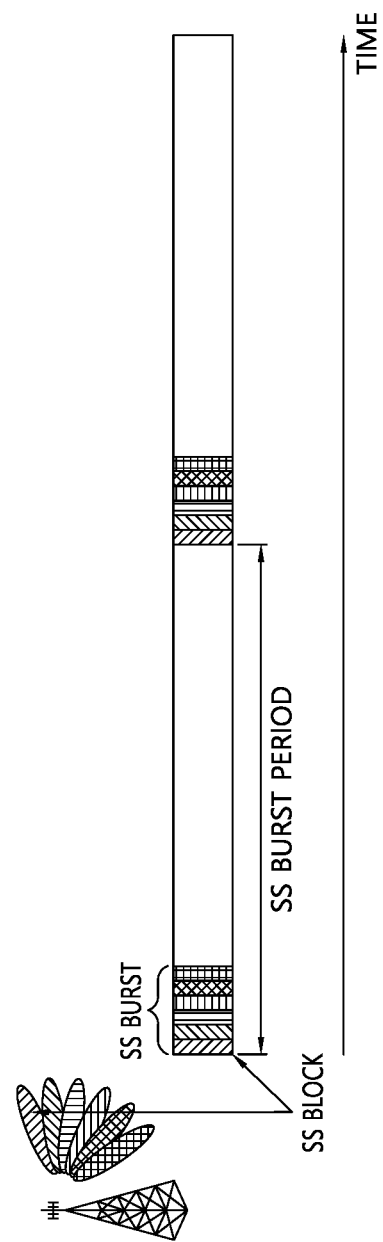
FIG. 4 is a diagram illustrating an example of an SS block in NR.

FIG. 4 is a diagram illustrating an example of an SS block in NR.

Referring to FIG. 4, an SS burst is transmitted in every predetermined periodicity. Accordingly, a UE receives SS blocks, and performs cell detection and measurement.

Meanwhile, in the 5G NR, beam sweeping is performed on an SS. A detailed description thereof will be provided with reference to FIG. 5.

Figure 5:
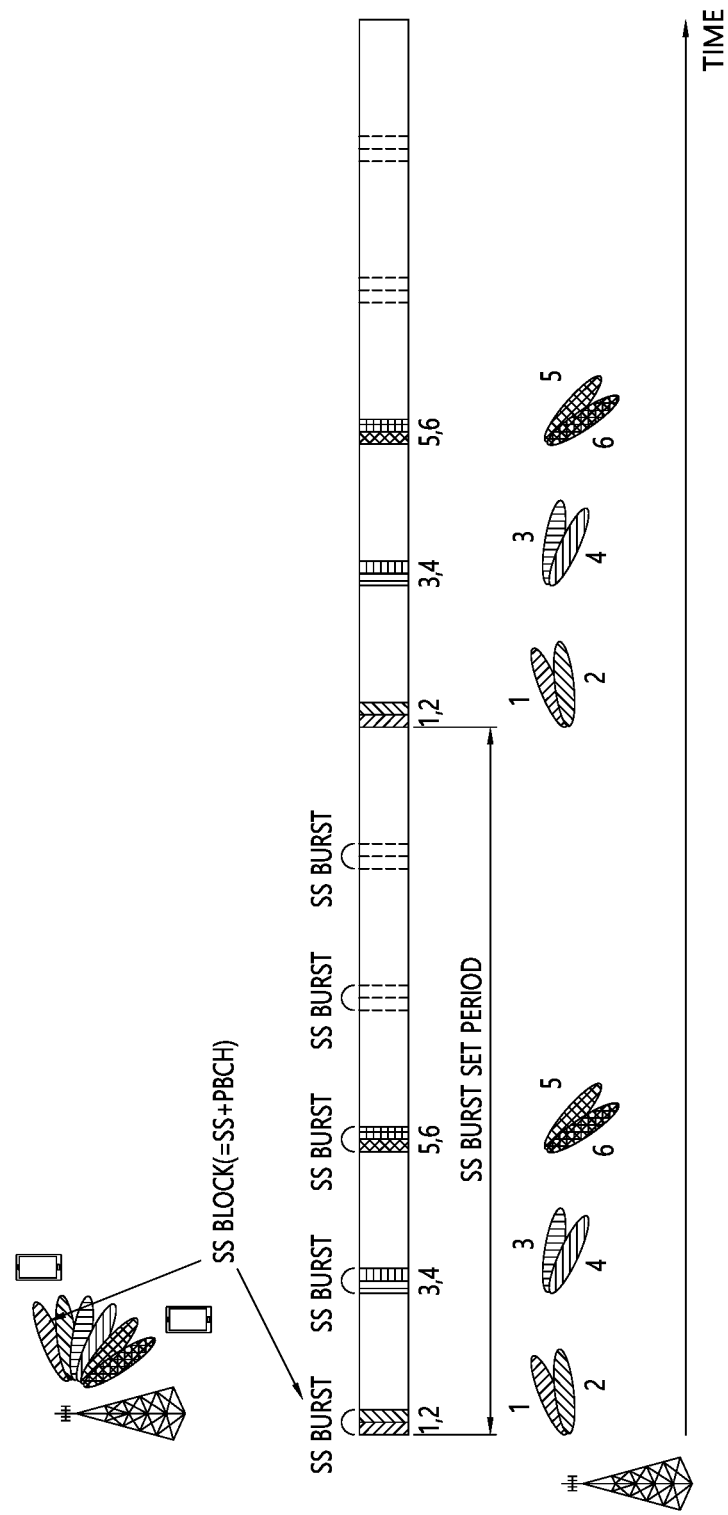
FIG. 5 is a diagram illustrating an example of beam sweeping in the NR.

FIG. 5 is a diagram illustrating an example of beam sweeping in the NR.

A base station transmits each SS block in an SS burst over time while performing beam sweeping. In this case, multiple SS blocks in an SS burst set are transmitted to support UEs existing in different directions. In FIG. 5, the SS burst set includes one to six SS blocks, and each SS burst includes two SS blocks.

<Cell Search>

Cell search is the procedure by which a UE acquires time and frequency synchronization with a cell and detects the cell ID of that cell. NR cell search is based on the primary synchronization signal (PSS) and secondary synchronization signal (SSS), and PBCH demodulation reference signal (DM-RS), located on the synchronization raster.

The cell search procedure of the UE can be summarized in Table 3.

TABLE 3

| | Type of Signals | Operations |
|---|---|---|
| $1^{st}$ step | PSS | SS/PBCH block (SSB) symbol timing acquisition Cell ID detection within a cell ID group (3 hypothesis) |
| $2^{nd}$ Step | SSS | Cell ID group detection (336 hypothesis) |
| $3^{rd}$ Step | PBCH DM-RS | SSB index and Half frame index (Slot and frameboundary detection) |
| $4^{th}$ Step | PBCH | Time information (80 ms, SFN, SSB index, HF) RMSI CORESET/Search space configuration |
| $5^{th}$ Step | PDCCH and PDSCH | Cell access information RACH configuration |

<SSB Based Measurement>

Examples of SSB based measurement are described.

For intra-frequency measurement, The UE shall be able to identify a new detectable intra-frequency cell within $T_{identify\_intra\_without\_index}$ if the UE is not indicated to report SSB based RRM measurement result with the associated SSB index (reportQuantityRsIndexes or maxNrofRSIndexesToReport is not configured), or the UE is indicated that the neighbor cell is synchronous with the serving cell (deriveSSB-IndexFromCell is enabled). Otherwise UE shall be able to identify a new detectable intra frequency cell within $T_{identify\_intra\_with\_index}$. The UE shall be able to identify a new detectable intra frequency SS block of an already detected cell within $T_{identify\_intra\_without\_index}$. It is assumed that deriveSSB-IndexFromCell is always enabled for FR1 TDD and FR2.

Herein, deriveSSB-IndexFromCell indicates whether the UE can utilize serving cell timing to derive the index of SS block transmitted by neighbor cell. If this field is set to true, the UE assumes System Frame Number (SFN) and frame boundary alignment across cells on the serving frequency. The UE may receive system information including deriveSSB-IndexFromCell from a serving cell. For example, the UE may receive SIB (System information block) 2 including deriveSSB-IndexFromCell from the serving cell.

$$T_{identify\_intra\_without\_index} = (T_{PSS/SSS\_sync\_intra} + T_{SSB\_measurement\_period\_intra})ms$$

$$T_{identify\_intra\_with\_index} = (T_{PSS/SSS\_sync\_intra} + T_{SSB\_measurement\_period\_intra} + T_{SSB\_time\_index\_intra})ms$$

$T_{PSS/SSS\_sync\_intra}$: it is the time period used in PSS/SSS detection $T_{SSB\_time\_index\_intra\_CCA}$: it is the time period used to acquire the index of the SSB being measured $T_{SSB\_measurement\_period\_intra\_CCA}$: equal to a measurement period of SSB based measurement The following drawings are prepared to explain a specific example of the present specification. Since the names of specific devices or names of specific signals/messages/fields described in the drawings are provided by way of example, technical features of the present specification are not limited to specific names used in the following drawings.

FIG. 6 shows an example of time period for detecting synchronization signal.

For example, FIG. 6 shows an example of time period for PSS/SSS detection in FR 2.

Note 1: If different SMTC periodicities are configured for different cells, the SMTC period in the requirement is the one used by the cell being identified.

Parameters shown in FIG. 6 may be defined as the following:

$M_{pss/sss\_sync\_w/o\_gaps}$: For a UE supporting FR2 power class 1 or 5, $M_{pss/sss\_sync\_w/o\_gaps}$=40. For a UE supporting power class 2, $M_{pss/sss\_sync\_w/o\_gaps}$=24. For a UE supporting FR2 power class 3, $M_{pss/sss\_sync\_w/o\_gaps}$=24. For a UE supporting FR2 power class 4, $M_{pss/sss\_sync\_w/o\_gaps}$=24.

$CSSF_{intra}$: it is a carrier specific scaling factor and is determined

When intra-frequency SMTC is partially overlapping with measurement gaps, Kp=1/(1−(SMTC period/MGRP)), where SMTC period<MGRP. When intra-frequency SMTC is partially overlapping with the Measurement Length (ML) of Network Controlled Small Gap (NCSG), Kp=1/(1−(SMTC period/VIRP)), where SMTC period<Visible Interruption Repetition Period (VIRP). For calculation of Kp, if the high layer signalling of smtc2 is configured, for cells indicated in the pci-List parameter in smtc2, the SMTC periodicity corresponds to the value of higher layer parameter smtc2; for the other cells, the SMTC periodicity corresponds to the value of higher layer parameter smtc1.

Here, smtc1 may mean Primary measurement timing configuration defined in 3GPP TS 38.331 V16.6.0. Here, smtc2 may mean secondary measurement timing configuration for SS corresponding to this MeasObjectNR with PCI listed in pci-List defined in 3GPP TS 38.331 V16.6.0. For these SS, the periodicity is indicated by periodicity in smtc2 and the timing offset is equal to the offset indicated in periodicityAndOffset modulo periodicity. periodicity in smtc2 can only be set to a value strictly shorter than the periodicity indicated by periodicityAndOffset in smtc1 (e.g. if periodicityAndOffset indicates sf10, periodicity can only be set of sf5, if periodicityAndOffset indicates sf5, smtc2 cannot be configured). The UE may receive Information Element (IE) MeasObjectNR from a serving cell. MeasObjectNR may include smtc1 and/or smtc2. The IE MeasObjectNR specifies information applicable for SS/PBCH block(s) intra/inter-frequency measurements and/or CSI-RS intra/inter-frequency measurements.

Smtc1 or smtc2 may include duration and periodicity-AndOffset. Duration may mean duration of the measurement window in which to receive SS/PBCH blocks. Duration is given in number of subframes. periodicityAndOffset may mean periodicity and offset of the measurement window in which to receive SS/PBCH blocks. Herein, the measurement window may be called as SMTC window in the present disclosure Physical Cell Identity (PCI)

For FR2, $K_{layer1\_measurement}$=1, if all of the reference signals configured for Radio Link Monitoring (RLM), Beam Failure Detection (BFD), Candidate Beam Detection (CBD) or L1-Reference Signal Received Power (RSRP) for beam reporting on any FR2 serving frequency in the same band outside measurement gap are not fully overlapped by intra-frequency SMTC occasions, or if all of the reference signal configured for RLM, BFD, CBD or L1-RSRP for beam reporting on any FR2 serving frequency in the same band outside measurement gap and fully-overlapped by intra-frequency SMTC occasions are not overlapped with any of the SSB symbols and the RSSI symbols, and 1 symbol before each consecutive SSB symbols and the RSSI symbols, and 1 symbol after each consecutive SSB symbols and the RSSI symbols, given that SSB-ToMeasure and SS-RSSI-Measurement are configured, where SSB symbols are indicated by the union set of SSB-ToMeasure from all the configured measurement objects on the same serving carrier which can be merged. and RSSI symbols are indicated by SS-RSSI-Measurement;

$K_{layer1\_measurement}$=1.5, otherwise.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 7 shows an example of measurement period.

FIG. 7 shows an example of Measurement period for intra-frequency measurements without gaps in FR 2.

NOTE 1: If different SMTC periodicities are configured for different cells, the SMTC period in the requirement is the one used by the cell being identified Here, $M_{meas\_period\_w/o\_gaps}$: For a UE supporting power class 1 or 5, $M_{meas\_period\_w/o\_gaps}$=40. For a UE supporting FR2 power class 2, $M_{meas\_period\_w/o\_gaps}$=24. For a UE supporting power class 3, $M_{meas\_period\_w/o\_gaps}$=24. For a UE supporting power class 4, $M_{meas\_period\_w/o\_gaps}$=24.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 8 shows an example of time period for detecting time index.

FIG. 8 shows an example of Time period for time index detection in FR 2. FIG. 8 may be applied when measurement gap is required.

NOTE 1: DRX or non DRX requirements apply according to the conditions described in clause 3.6.1 of 3GPP TS 38.133 V16.9.0.

NOTE 2: In EN-DC operation, the parameters, timers and scheduling requests referred to in clause 3.6.1 of 3GPP TS 38.133 V16.9.0 are for the secondary cell group. The DRX cycle is the DRX cycle of the secondary cell group.

NOTE 3: For a UE supporting concurrent gaps, the MRGP above is the MRGP of the measurement gap associated with the target frequency layer to be measured if concurrent measurement gaps are configured.

$M_{SSB\_index\_inter}$: For a UE supporting FR2 power class 1 or 5, $M_{SSB\_index\_inter}$=40 samples. For a UE supporting FR2 power class 2, $M_{SSB\_index\_inter}$=24 samples. For a UE supporting FR2 power class 3, $M_{SSB\_index\_inter}$=24 samples. For a UE supporting FR2 power class 4, $M_{SSB\_index\_inter}$=24 samples.

Same parameters in FIG. 6 to FIG. 8 may be defined in a same way.

<Disclosure of the Present Specification>

In Subcarrier Spacing (SCS) above 480 kHz, the symbol length is smaller than symbol length of SCS smaller than 480 kHz. For example, operating bands of Frequency Range (FR) 2-2 in NR supports SCS of 480 kHz, and 960 kHz. However, conventionally, small symbol length due to SCS above 480 kHz was not considered for performing measurement.

For example, even in the synchronous state, the serving signal received by the UE and the signal of the neighbor cell may deviate by a certain symbol. The UE may measure SSB-based RSRP according to the prior art. In this case, when the SMTC window is configured, the symbol length according to the SCS of 480 kHz or higher is not considered. Due to this, a problem may occur that the SSB of the neighbor cell is not partially included in the SMTC window, and may affect the accuracy of the RSRP measured by the UE.

480/960 kHz-based SCS supported in the NR FR2-2 frequency band may be applied. According to the SCS of 480 kHz or higher, the symbol duration is small Due to this, when the terminal receives the signals of the serving cell and the neighboring cell, a reception timing error may occur. In order to perform SSB-based measurement in consideration of the data transmission/reception limitation due to the reception timing error and the reception timing error, the SMTC setting needs to be discussed.

Figure 9:
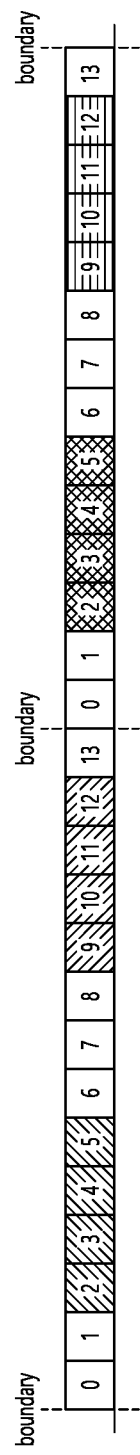
FIG. 9 illustrates an example of SSB pattern.

As mentioned above, NR FR 2-2 frequency range is defined by Table 2. 120 kHz, 480 kHz, and 960 kHz SCS (Subcarrier spacing) is supported in 1-R2-2. Following FIG. 9 is an example of the new SSB pattern for 480 and 960 kHz SCS for NR FR2-2. For 120 kHz SCS, the same SSB pattern for FR2-1 is used.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 9 illustrates an example of SSB pattern.

FIG. 9 shows an example of SSB pattern for 480 kHz/960 kHz SCS. As shown in FIG. 9, SSB may be transmitted within 4 consecutive symbols.

The UE may perform measurement based on SSB. SSB may be transmitted from a serving cell and/or a neighbor cell.

To measure SS-RSRP, SS-RSRQ, and SS-SINR based on neighbor SSB, a UE can use serving cell timing if deriveSSB-IndexFromCell is enabled. Here, neighbor SSB may mean SSB transmitted by a neighbor cell.

Herein, deriveSSB-IndexFromCell indicates whether the UE can utilize serving cell timing to derive the index of SS block transmitted by neighbor cell. If this field is set to true, the UE assumes SFN and frame boundary alignment across cells on the serving frequency. The UE may receive system information including deriveSSB-IndexFromCell from a serving cell. For example, the UE may receive SIB (System information block) 2 including deriveSSB-IndexFromCell from the serving cell.

Conventionally, for 1-R2 (FR2-1), deriveSSB-IndxFromCell was always enabled, so the UE measure neighbor cell SSB using serving cell timing. For example, the UE may measure SSB transmitted by the neighbor cell by using timing of serving cell, because deriveSSB-IndxFromCell was always enabled. The tolerance of frame boundary alignment across cells on the same frequency carrier is min (2 SSB symbols, 1 PDSCH symbol). That is, the tolerance may be minimum value between 2 SSB symbols and 1 PDSCH symbol. And cell phase synchronization accuracy is 3 usec in case TDD deployment. Herein, cell phase synchronization accuracy may mean maximum absolute deviation in frame start timing between any pair of cells on the same frequency that have overlapping coverage areas. However, since symbol duration is getting smaller as the SCS increases, the value of is min(2 SSB symbols, 1 PDSCH symbol) is less than cell phase synchronization accuracy for 480/960 kHz SCS. So, deriveSSB-IndexFromCell could not be always enabled for FR2-2 frequency range. Therefore, deriveSSB-IndexFromCell should be up to network configuration.

Thus, deriveSSB-IndexFromCell may be enabled or disabled based on network configuration for FR 2-2. That is, the serving cell may configure deriveSSB-IndexFromCell to be enabled or disabled.

Hereinafter, examples of scheduling restriction, examples of measurement based on SSB may be described for 2 cases, which are 1) deriveSSB-IndexFromCell is enabled, 2) deriveSSB-IndexFromCell is not enabled.

1. With deriveSSB-IndexFromCell (When deriveSSB-IndexFromCell Is Enabled)

If deriveSSB-IndexFromCell is enabled by network for high SCS, it may imply that the offset of frame boundary alignment across cells would be less than min (2 SSB symbols, 1 PDSCH symbol). That is, when deriveSSB-IndexFromCell is enabled, difference between frame boundary of serving cell and neighbor cell is less than min (2 SSB symbols, 1 PDSCH symbol). Therefore, the UE can assume that the offset of frame boundary alignment across cells should be less than min (2 SSB symbols, 1 PDSCH symbol) if deriveSSB-IndexFromCell is enabled by network for high SCS.

The following drawings are prepared to explain a specific example of the present specification. Since the names of specific devices or names of specific signals/messages/fields described in the drawings are provided by way of example, technical features of the present specification are not limited to specific names used in the following drawings.

Figure 10:
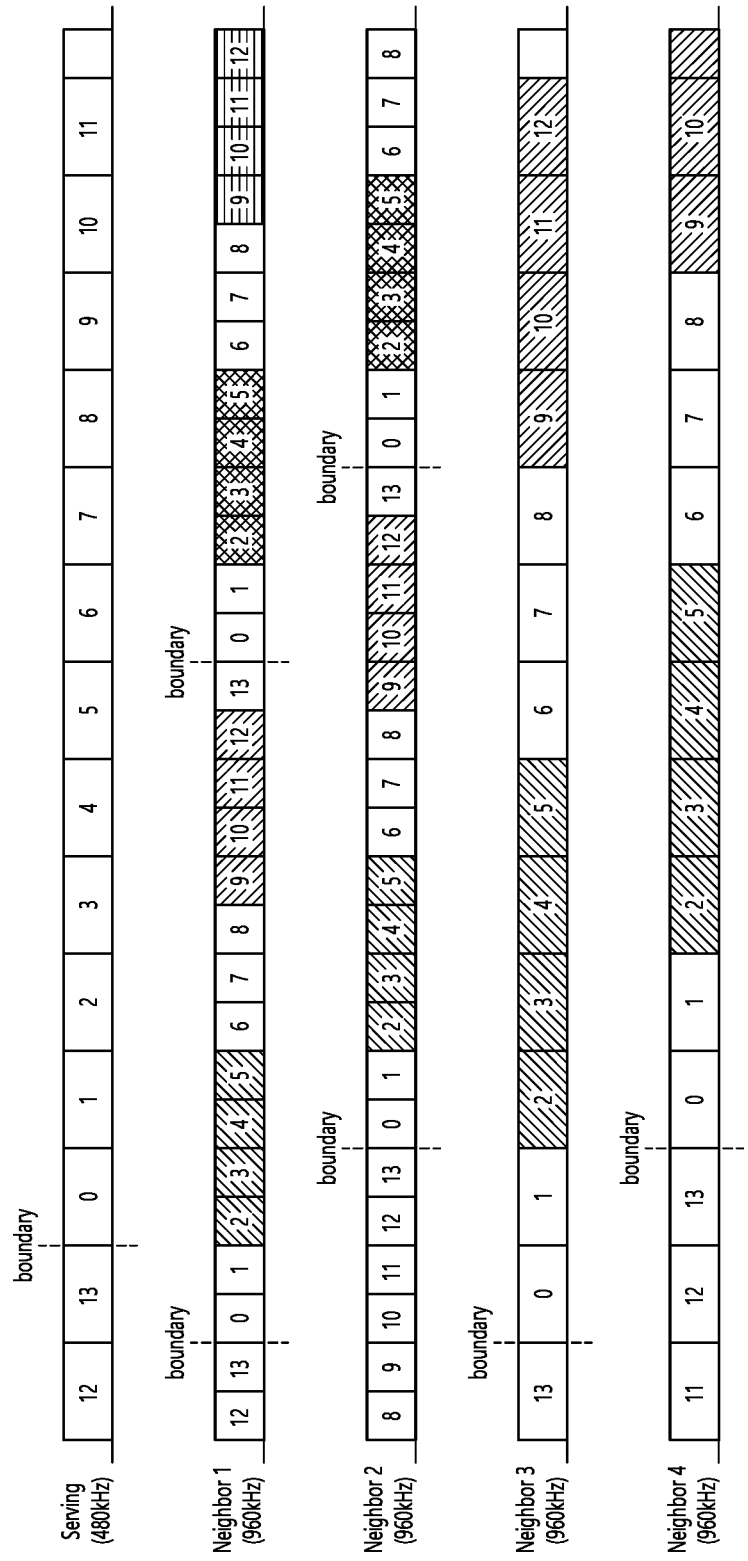
FIG. 10 illustrates an example of tolerance for SCS of 480 kHz.

FIG. 10 illustrates an example of tolerance for SCS of 480 kHz.

FIG. 10 show an example of tolerance min(2SSB symbols, 1 PDSCH symbol). As shown in in FIG. 10, frame boundary of Serving cell with SCS 480 kHz is the boundary between symbol 13 of the first slot and symbol 0 of the second slot.

As shown in FIG. 10, frame boundaries of neighbor cells 1 to 4 are all aligned within min (2 SSB symbols, 1 PDSCH symbol) from the boundary of serving cell.

In this case, the scheduling restriction may be introduced by 2 data symbols before and/or after each consecutive SSB symbols configured to be measured regardless of beam switching time within SMTC window duration. It is because that new SSB pattern in a slot for high SCS was agreed as shown in FIG. 9 unlike conventional SSB pattern of FR2-1.

The following drawings are prepared to explain a specific example of the present specification. Since the names of specific devices or names of specific signals/messages/fields described in the drawings are provided by way of example, technical features of the present specification are not limited to specific names used in the following drawings.

Figure 11A:
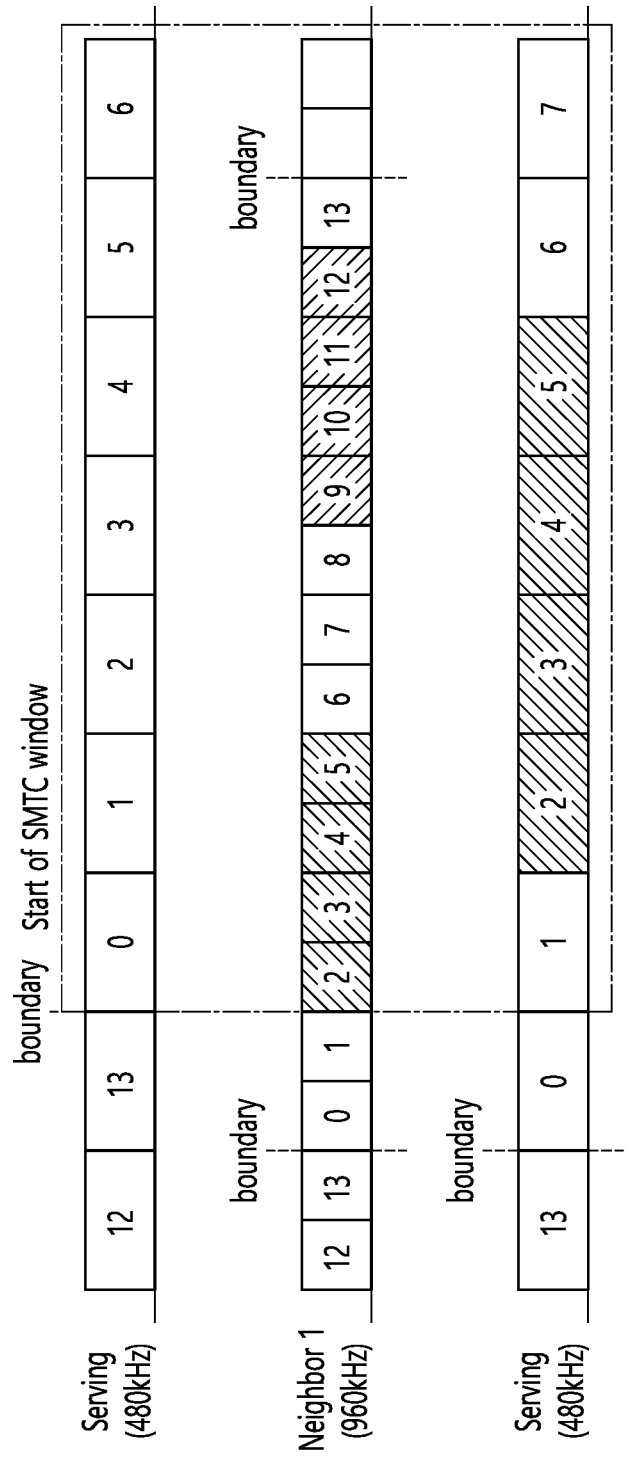
FIG. 11*a* illustrates a first example of timing offset considering tolerance for SCS of 480 kHz.
Figure 11B:
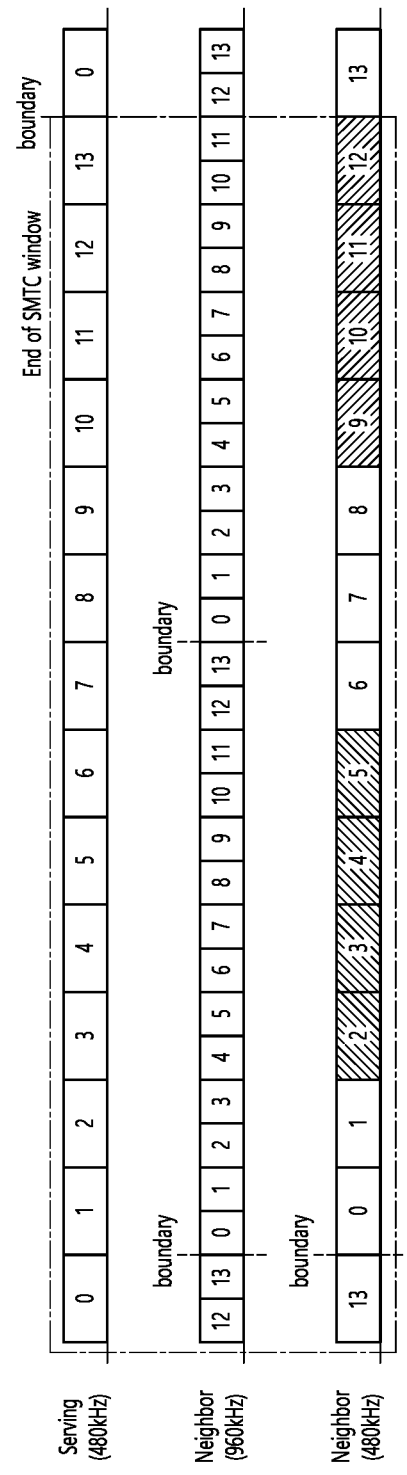
FIG. 11*b* illustrates a second example of timing offset considering tolerance for SCS of 480 kHz.

FIG. 11a illustrates a first example of timing offset considering tolerance for SCS of 480 kHz. FIG. 11b illustrates a second example of timing offset considering tolerance for SCS of 480 kHz.

FIG. 11a and FIG. 11b shows example of timing offset between SCS configuration considering min(2 SSB symbol, 1 PDSCH symbol) tolerance.

The SCS of serving cell may be 480 kHz and the SCS of neighbor cell's SSB may be 960 kHz as shown in in FIG. 11a. In this case, scheduling restriction may be applied to #13 symbol (the last symbol of a slot) before starting SMTC window of serving cell, when the beam switching time is defined as 200 ns. Here, beam switching time of 200 ns may be defined by considering 1 data symbol tolerance to measure SSB for 960 kHz SCS. In case 50 ns beam switching time, no scheduling restriction is needed for the #13 symbol. This is because of relationship between beam switching time and CP length. For example, CP length for 480 kHz SCS may be 146 nsec and CP length for 960 kHz SCS may be 73 nsec. When beam switching time is 200 nsec, the beam switching time is larger than CP length for both 480 kHz SCS and 960 kHz SCS. Thus, scheduling restriction is applied to this situation. On the other hand, when the beam switching time is 50 ns, because of 50 ns being smaller than CP length for both 480 kHz SCS and 960 kHz SCS, transmission or reception on the symbol is not affected, thus scheduling restriction is not needed.

SCS of both serving and neighbor cell may be 480 kHz as shown in FIG. 11b. In this case, scheduling restriction may be applied to #0 symbol after end of SMTC window of serving cell, when the beam switching time would be defined as 200 ns.

In short, if deriveSSB-IndexFromCell is enabled and the beam switching time is larger than CP length for high SCS, the scheduling restriction should apply to the last symbol before starting SMTC window and the first symbol after end of SMTC window. For example, CP length for 480 kHz SCS may be 146 nsec and CP length for 960 kHz SCS may be 73 nsec.

Scheduling restriction is described herein after with examples.

The following scheduling restriction applies to SS-RSRP measurement or SS-SINR measurement on an FR2-2 intra-frequency cell:

If the signaling deriveSSB_IndexFromCell is enabled for FR2-2, the UE is not expected to transmit PUCCH/PUSCH/SRS or receive PDCCH/PDSCH/TRS/CSI-RS for CQI on SSB symbols to be measured, and on 2 data symbols before each consecutive SSB symbols to be measured and 2 data symbols after each consecutive SSB symbols to be measured within SMTC window duration. For example, the UE is not expected to transmit data to the serving cell and to receive data from the serving cell on SSB symbols to be measured. If the high layer signaling of smtc2 is configured, the SMTC periodicity follows smtc2; Otherwise the SMTC periodicity follows smtc1. If the beam switching time is larger than the CP length for FR2-2 SCS, the UE is not expected to transmit PUCCH/PUSCH/SRS or receive PDCCH/PDSCH/TRS/ CSI-RS for CQI on the last symbol before starting SMTC window and the first symbol after end of SMTC window.

The following scheduling restriction applies to SS-RSRQ measurement on an FR2-2 intra-frequency cell:

If the signaling deriveSSB_IndexFromCell is enabled for FR2-2, the UE is not expected to transmit PUCCH/PUSCH/SRS or receive PDCCH/PDSCH/TRS/CSI-RS for CQI on SSB symbols to be measured, RSSI measurement symbols, and on 2 data symbols before each consecutive SSB to be measured/RSSI symbols and 2 data symbols after each consecutive SSB to be measured/RSSI symbols within SMTC window duration. If the high layer signalling of smtc2 is configured, the SMTC periodicity follows smtc2; Otherwise the SMTC periodicity follows smtc1. If the beam switching time is larger than the CP length for FR2-2 SCS, the UE is not expected to transmit PUCCH/PUSCH/SRS or receive PDCCH/PDSCH/TRS/CSI-RS for CQI on the last symbol before starting SMTC window and the first symbol after end of SMTC window.

2. Without deriveSSB-IndexFromCell (when deriveSSB-IndexFromCell is not Enabled)

If deriveSSB-IndexFromCell by network is not enabled for high SCS, a UE has to detect neighbor cell's frame boundary. The offset of frame boundary alignment across cells would be less than cell phase synchronization accuracy which is 3 usec. So, the scheduling restriction may be introduced by 3 data symbols before and after each consecutive SSB symbols, which are configured to be measured, regardless of beam switching time within SMTC window duration.

The following drawings are prepared to explain a specific example of the present specification. Since the names of specific devices or names of specific signals/messages/fields described in the drawings are provided by way of example, technical features of the present specification are not limited to specific names used in the following drawings.

Figure 12A:
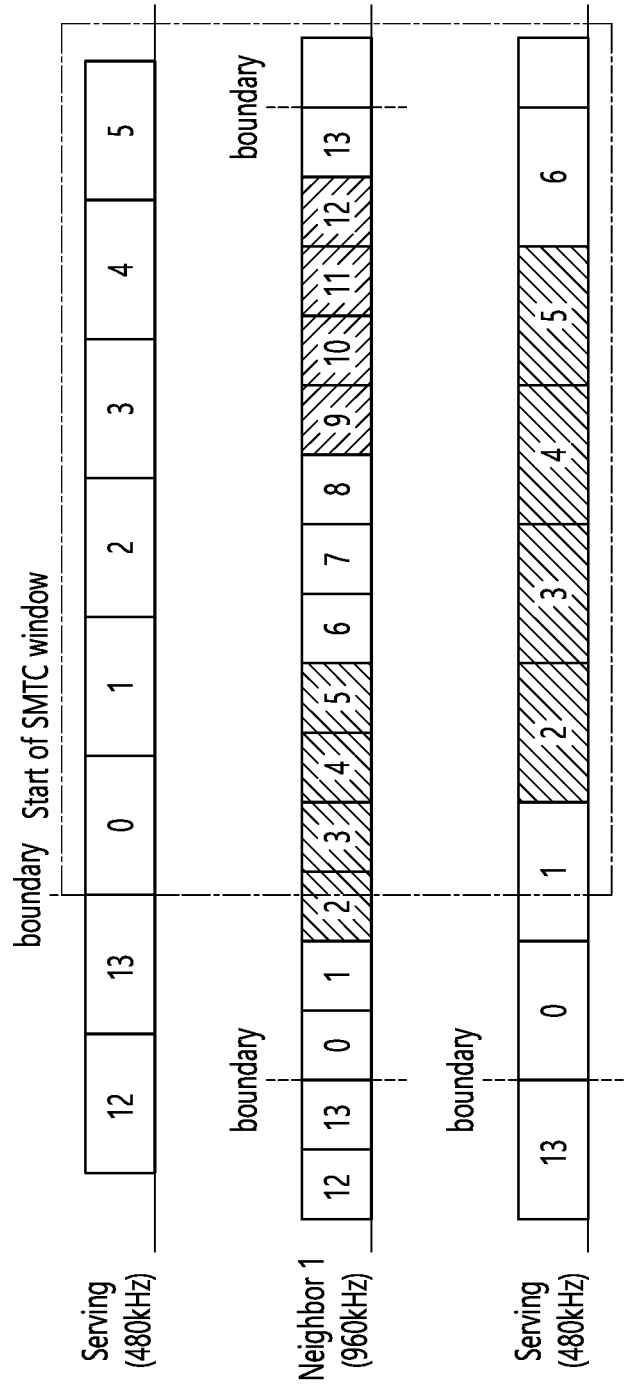
FIG. 12*a* illustrates a first example of timing offset considering cell phase synchronous accuracy.
Figure 12B:
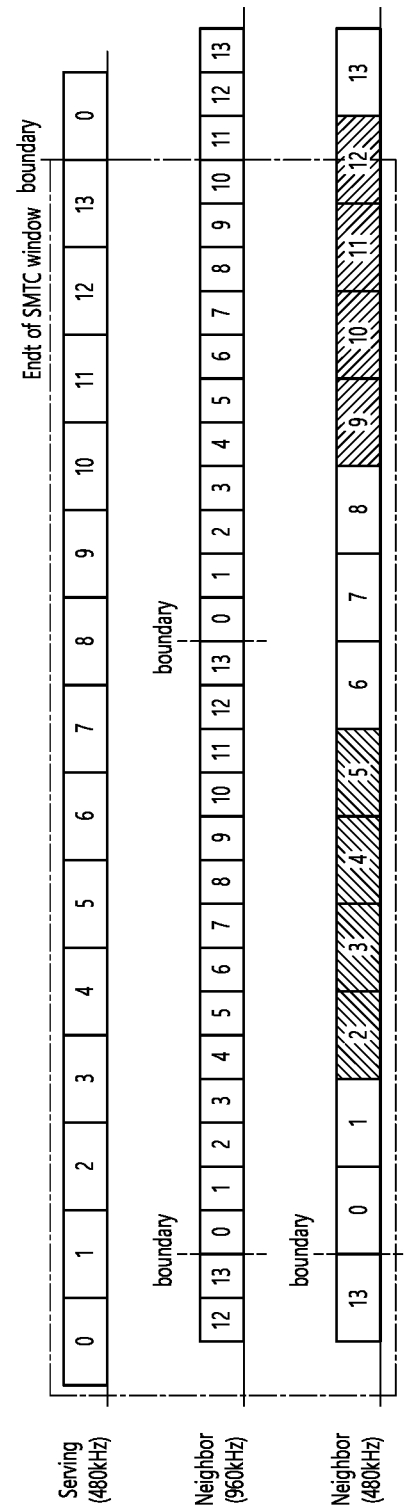
FIG. 12*b* illustrates a second example of timing offset considering cell phase synchronous accuracy.

FIG. 12a illustrates a first example of timing offset considering cell phase synchronous accuracy. FIG. 12b illustrates a second example of timing offset considering cell phase synchronous accuracy.

FIG. 12a and FIG. 12b show examples of timing offset between SCS configuration considering cell phase synchronous accuracy.

The SCS of serving cell may be 480 kHz and the SCS of neighbor cell's SSB may be 480 kHz/960 kHz in FIG. 12a and FIG. 12b, the SSB symbol could be partially located outside SMTC window duration. Due to this, SSB measurement accuracy could be affected. To resolve this issue, following methods may be considered:

Method 1) additional margin such as one slot, half slot, or symbol(s) may be added before and/or after STMC window duration to maintain all SSB symbols within STMC window duration. For example, extension of SMTC window duration may be applied. For example, the serving cell may configure additional margin and transmit information related to the additional margin to the UE.

Method 1-1) As an example, introduce 0.5 msec and 1.5 msec SMTC window duration. For example, 0.5 msec and 1.5 msec of additional SMTC window duration may be added to conventional SMTC window duration.

Method 2) add minus offset option (e.g., slot or symbol level) for SMTC periodicityAndOffset to cover all SSB symbols. For example, starting point of SMTC window may be configured to start early as the minus offset. For example, when minus offset option is added, starting point of SMTC window may be moved to cover #2 symbol of neighbor cell with 960 kHz in FIG. 12a. Herein, SMTC periodicityAnd- Offset may mean periodicity and offset of the measurement window in which to receive SS/PBCH blocks. For example, the serving cell may configure minus offset and transmit information related to the minus offset to the UE.

Method 3) the UE is allowed to measure SSB of neighbor cell in advance certain duration before starting SMTC window and/or including certain duration after end of SMTC window. The certain duration could a slot, half slot, or symbol(s) depending on neighbor cell's timing. Additional scheduling restriction for the certain duration may be required. The UE may configure the certain duration by considering timing of neighbor cells.

Scheduling restriction is described herein after with examples.

The following scheduling restriction applies due to SS-RSRP measurement or SS-SINR measurement on an 1-R2-2 intra-frequency cell:

If the signaling deriveSSB_IndexFromCell is not enabled for FR2-2, the UE is not expected to transmit PUCCH/PUSCH/SRS or receive PDCCH/PDSCH/TRS/CSI-RS for CQI on SSB symbols to be measured, and on 3 data symbols before each consecutive SSB symbols to be measured and 3 data symbols after each consecutive SSB symbols to be measured within SMTC window duration. If the high layer signalling of smtc2 is configured, the SMTC periodicity follows smtc2; Otherwise the SMTC periodicity follows smtc1.

The following scheduling restriction applies to SS-RSRQ measurement on an FR2-2 intra-frequency cell:

If the signaling deriveSSB_IndexFromCell is not enabled for FR2-2, the UE is not expected to transmit PUCCH/PUSCH/SRS or receive PDCCH/PDSCH/TRS/CSI-RS for CQI on SSB symbols to be measured, RSSI measurement symbols, and on 3 data symbols before each consecutive SSB to be measured/RSSI symbols and 3 data symbols after each consecutive SSB to be measured/RSSI symbols within SMTC window duration. If the high layer signalling of smtc2 is configured, the SMTC periodicity follows smtc2; Otherwise the SMTC periodicity follows smtc1.

For above three methods, measurement gap configuration may also be modified.

For example, for method 1), the same additional margin window may be added before and after measurement gap length. For method 1-1), 1 msec and 2 msec MG length may be introduced. For example, additional 1 msec MG length and/or 2 msec MG length may be added to conventional MG length.

For example, for method 2), the same minus offset option for gapOffset to cover SMTC window may be defined.

For method 3), the UE is allowed to retune RF carrier frequency to measure SSB of neighbor cell before starting SMTC window and/or after end of SMTC window. MG timing advance of the certain duration should be applied (including RF retuning time 0.25 msec), and/or MG should be maintained for the certain duration after MG (including RF retuning time 0.25 msec) by the UE.

The above methods may be applied regardless of deriveSSB-IndexFromCell since additional timing difference could be introduced due to signal propagation difference between serving cell and neighbor cell.

For the UE side, the UE may measure and report RSRP/RSRQ/SINR with configured SMTC/MG based on above methods. Then the network (e.g. serving cell) may manage UE mobility such as handover based on the reported measurements.

The following drawings are prepared to explain a specific example of the present specification. Since the names of specific devices or names of specific signals/messages/fields described in the drawings are provided by way of example, technical features of the present specification are not limited to specific names used in the following drawings.

Figure 13:
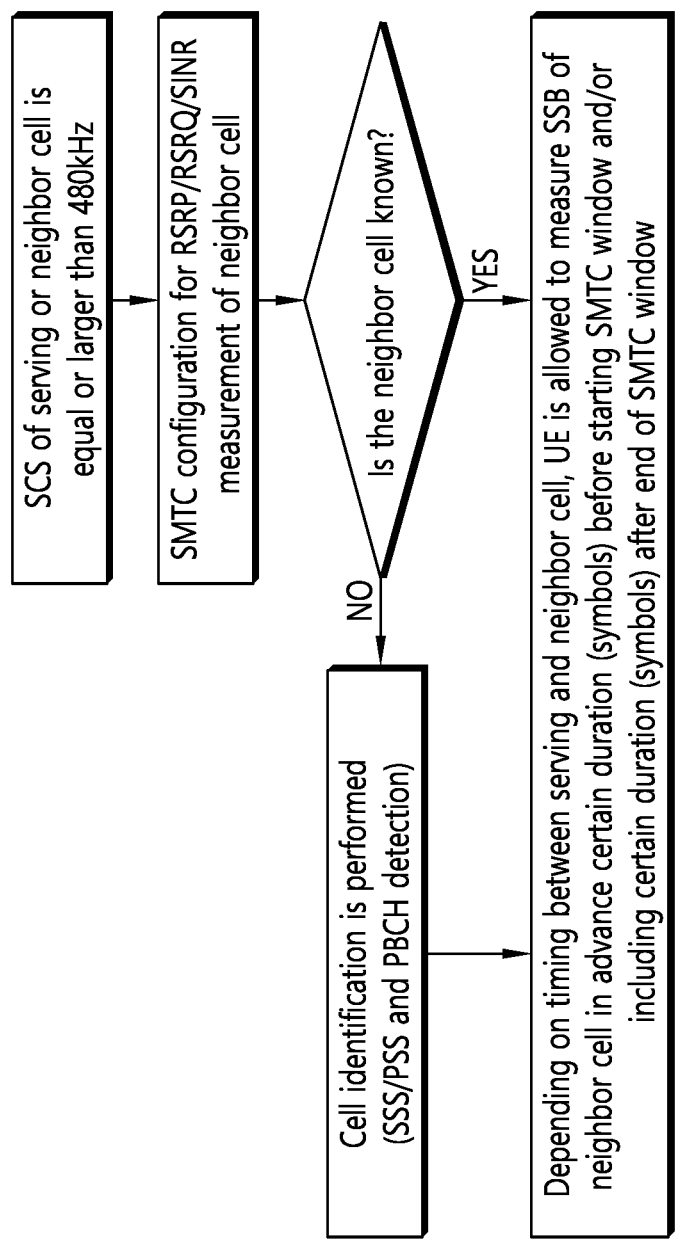
FIG. 13 illustrates an example of operations of a UE performing measurement to the present disclosure.

FIG. 13 illustrates an example of operations of a UE performing measurement to the present disclosure.

SCS of serving cell or neighbor cell may be equal to or larger than 480 kHz.

SMTC configuration is determined based on that the SCS of serving cell or neighbor cell is equal to or larger than 480 kHz. SMTC configuration is configured for RSRP/RSRQ/SINR measurement of neighbor cell.

The UE may determine whether the neighbor cell is known or not.

If the neighbor cell is not known, the UE performs cell identification. For example, the UE may perform SSS/PSS detection and PBCH detection. After the UE performs cell identification, the UE may perform measurement based on SSB of neighbor cell.

If the neighbor cell is known, the UE may perform measurement based on SSB of neighbor cell.

When the UE performs measurement based on SSB of neighbor cell based on examples described in the present disclosure. For example, the following may be applied. Depending on timing between serving cell and neighbor cell, the UE is allowed to measure SSB neighbor cell in advance by certain duration (e.g. symbols) before starting SMTC window and/or including certain duration (symbols) after the end of SMTC window.

The following drawings are prepared to explain a specific example of the present specification. Since the names of specific devices or names of specific signals/messages/fields described in the drawings are provided by way of example, technical features of the present specification are not limited to specific names used in the following drawings.

Figure 14:
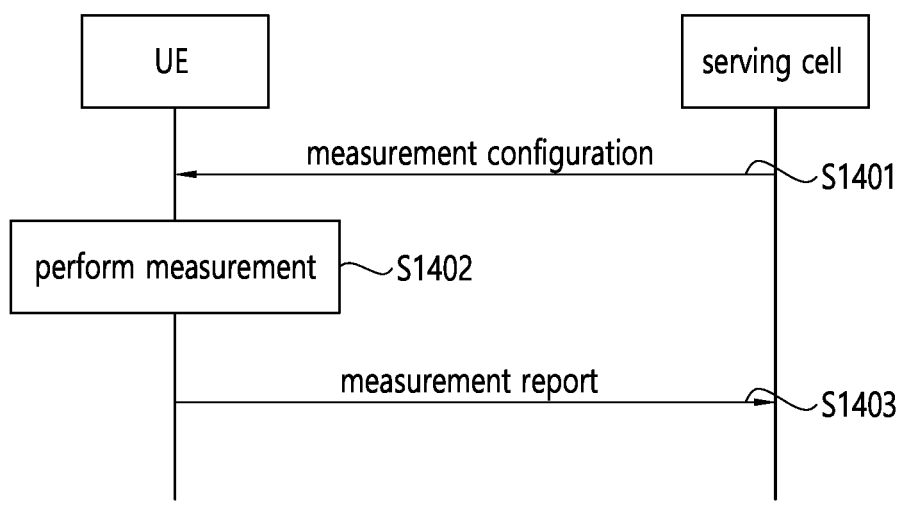
FIG. 14 illustrates an example of operations of a UE and serving cell according to the present disclosure.

FIG. 14 illustrates an example of operations of a UE and serving cell according to the present disclosure.

FIG. 14 shows an example of operations of the UE and serving cell. UE and/or serving cell may perform operations described in the present specification, even if they are not shown in FIG. 14. Herein, a network may be gNB, base station, serving cell, etc.

The UE and the network (e.g. serving cell) may perform operations explained above with various examples.

In step S1401, the serving cell may transmit information related to measurement configuration to the UE. The UE may receive information related to measurement configuration from a network (e.g. base station, serving cell).

In step S1402, the UE may perform measurement. The UE may perform measurement based on examples of the present disclosure. For example, the UE may perform measurement of SSB transmitted from the neighbor cell and/or the serving cell, depending on whether the UE can utilize timing of the serving cell to derive the index of SS block transmitted by the neighbor cell. For example, the UE may perform measurement for the neighbor cell based on whether deriveSSB-IndexFromCell is enabled or not.

For example, when deriveSSB-IndexFromCell is enabled, the following examples are applied. The UE may assume that the offset of frame boundary alignment across cells should be less than min(2 SSB symbols, 1 PDSCH symbol). The following scheduling restriction applies due to SS-RSRP or SS-SINR measurement on an FR2-2 intra-frequency cell. For FR2-2, the UE may not be expected to transmit PUCCH/PUSCH/SRS or receive PDCCH/PDSCH/TRS/CSI-RS for CQI on SSB symbols to be measured, and on 2 data symbols before each consecutive SSB symbols to be measured and 2 data symbols after each consecutive SSB symbols to be measured within SMTC window duration. If the beam switching time is larger than the CP length for FR2-2 SCS, the UE may not be expected to transmit PUCCH/PUSCH/SRS or receive PDCCH/PDSCH/TRS/CSI-RS for CQI on the last symbol before starting SMTC window and the first symbol after end of SMTC window. The following scheduling restriction applies to SS-RSRQ measurement on an FR2-2 intra-frequency cell. For FR2-2, the UE is not expected to transmit PUCCH/PUSCH/SRS or receive PDCCH/PDSCH/TRS/CSI-RS for CQI on SSB symbols to be measured, RSSI measurement symbols, and on 2 data symbols before each consecutive SSB to be measured/RSSI symbols and 2 data symbols after each consecutive SSB to be measured/RSSI symbols within SMTC window duration. If the beam switching time is larger than the CP length for FR2-2 SCS, the UE may not be expected to transmit PUCCH/PUSCH/SRS or receive PDCCH/PDSCH/TRS/CSI-RS for CQI on the last symbol before starting SMTC window and the first symbol after end of SMTC window.

For example, when deriveSSB-IndexFromCell is not enabled, the following examples are applied. Method 1) additional margin such as one slot, half slot, or symbol(s) may be added before and/or after STMC window duration to maintain all SSB symbols within STMC window duration. For example, extension of SMTC window duration may be applied. Method 1-1) As an example, introduce 0.5 msec and 1.5 msec SMTC window duration. Method 2) add minus offset option (e.g., slot or symbol level) for SMTC periodicityAndOffset to cover all SSB symbols. For example, starting point of SMTC window may be configured to start early as the minus offset. For example, when minus offset option is added, starting point of SMTC window may be moved to cover #2 symbol of neighbor cell with 960 kHz in FIG. 12a. Method 3) the UE is allowed to measure SSB of neighbor cell in advance certain duration before starting SMTC window and/or including certain duration after end of SMTC window. The certain duration could a slot, half slot, or symbol(s) depending on neighbor cell's timing. Additional scheduling restriction for the certain duration may be required. The certain duration may be configured by the serving cell by considering timing of neighbor cells. The following scheduling restriction applies due to SS-RSRP or SS-SINR measurement on an FR2-2 intra-frequency cell. For FR2-2, the UE may not be expected to transmit PUCCH/PUSCH/SRS or receive PDCCH/PDSCH/TRS/CSI-RS for CQI on SSB symbols to be measured, and on 3 data symbols before each consecutive SSB symbols to be measured and 3 data symbols after each consecutive SSB symbols to be measured within SMTC window duration. The following scheduling restriction applies to SS-RSRQ measurement on an FR2-2 intra-frequency cell. For FR2-2, the UE may not be expected to transmit PUCCH/PUSCH/SRS or receive PDCCH/PDSCH/TRS/CSI-RS for CQI on SSB symbols to be measured, RSSI measurement symbols, and on 3 data symbols before each consecutive SSB to be measured/RSSI symbols and 3 data symbols after each consecutive SSB to be measured/RSSI symbols within SMTC window duration.

In step S1403, the UE may transmit measurement report to the serving cell. For example, after the UE perform the measurement, the UE may transmit measurement report to the base station. Then the network (e.g. serving cell) may manage UE mobility such as handover based on the reported measurements.

Hereinafter, an apparatus (for example, UE) in a wireless communication system, according to some embodiments of the present disclosure, will be described.

For example, the apparatus may include at least one processor, at least one transceiver, and at least one memory.

For example, the at least one processor may be configured to be coupled operably with the at least one memory and the at least one transceiver.

For example, the processor may be configured to perform operations explained in various examples of the present specification. For example, the processor may be configure to perform operations including: receiving measurement configuration information from a base station; and performing measurement based on the measurement configuration information; and transmitting measurement report based on the measurement.

Hereinafter, a processor for in a wireless communication system, according to some embodiments of the present disclosure, will be described.

For example, the processor may be configured to perform operations including: receiving measurement configuration information from a base station; and performing measurement based on the measurement configuration information; and transmitting measurement report based on the measurement.

Hereinafter, a non-transitory computer-readable medium has stored thereon a plurality of instructions in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a UE to perform operations including: obtaining measurement configuration information including information related to SMTC window; performing measurement based on the measurement configuration information; and generating measurement report based on the measurement.

Hereinafter, an apparatus (for example, base station) in a wireless communication system, according to some embodiments of the present disclosure, will be described.

For example, the apparatus may include at least one processor, at least one transceiver, and at least one memory.

For example, the at least one processor may be configured to be coupled operably with the at least one memory and the at least one transceiver.

For example, the processor may be configured to perform operations explained in various examples of the present specification. For example, the processor may be configure to perform operations including: obtaining measurement configuration information including information related to SMTC window; performing measurement based on the measurement configuration information; and generating measurement report based on the measurement.

Advantageous effects which can be obtained through specific embodiments of the present disclosure. For example, RSRP accuracy can be guaranteed. The accuracy of the RSRP measured by the UE may increase based on the examples of the present disclosure. It may be because that all SSBs are configured to be measured in time duration including SMTC window, which is configured for the UE to measure SSBs.

In the above exemplary systems, although the methods have been described on the basis of the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:
1. A method comprising:
receiving a measurement configuration including information related to a synchronization signal measurement window from a network;
performing a measurement based on the measurement configuration; and
transmitting results of the measurement to the network,
wherein the measurement is performed for a synchronization signal from a neighbor cell during the synchronization signal measurement window and a time duration including an additional synchronization signal measurement window or a certain duration before or after the synchronization signal measurement window, based on a subcarrier spacing being equal to or larger than 480 kHz, and
wherein the additional synchronization signal measurement window is 0.5 msec or 1.5 msec.
2. The method of claim 1,
wherein the certain duration is added to the synchronization signal measurement window before and/or after the synchronization signal measurement window.
3. The method of claim 1,
wherein the certain duration is applied as an offset advancing a starting time of the synchronization signal measurement window.
4. The method of claim 1,
wherein the certain duration is determined based on a timing of the neighbor cell,
wherein a user equipment (UE) is not expected to transmit or receive signal to or from a serving cell.
5. The method of claim 1, further comprising:
receiving information related to whether a UE can utilize timing of a serving cell to derive an index of the synchronization signal transmitted by the neighbor cell.
6. The method of claim 5,
wherein the UE is not expected to transmit or receive signal to or from the serving cell 2 data symbols before and after the time duration, based on the information indicating that the UE can utilize the timing of the serving cell to derive the index of the synchronization signal transmitted by the neighbor cell.
7. The method of claim 5,
wherein the UE is not expected to transmit or receive signal to or from the serving cell 3 data symbols before and after the time duration, based on the information indicating that the UE cannot utilize the timing of the serving cell to derive the index of the synchronization signal transmitted by the neighbor cell.
8. A user equipment (UE) comprising:
at least one transceiver;
at least one processor; and
at least one computer memory operably connectable to the at least one processor and storing instructions that, based on being executed by the at least one processor, perform operations comprising:
receiving, via the at least one transceiver, a measurement configuration information including information related a synchronization signal measurement window from a network;
performing a measurement based on the measurement configuration; and
transmitting results of the measurement to the network,
wherein the measurement is performed for a synchronization signal from a neighbor cell during the synchronization signal measurement window and a time duration including an additional synchronization signal measurement window or a certain duration before or after the synchronization signal measurement window, based on a subcarrier spacing being equal to or larger than 480 kHz, and wherein the additional synchronization signal measurement window is 0.5 msec or 1.5 msec.

9. The UE of claim 8, wherein the UE is an autonomous driving device that communicates with at least one of a mobile terminal, a network, and an autonomous vehicle other than the UE.

10. A processing apparatus, adapted to control a wireless device, comprising:

at least one processor; and at least one computer memory operably connectable to the at least one processor, wherein the at least one processor is configured to perform operations comprising:

obtaining a measurement configuration including information related to a synchronization signal measurement window;

performing a measurement based on the measurement configuration; and generating results of the measurement, wherein the measurement is performed for a synchronization signal from a neighbor cell during the synchronization signal measurement window and a time duration including an additional synchronization signal measurement window or a certain duration before or after the synchronization signal measurement window, based on a subcarrier spacing being equal to or larger than 480 kHz, and wherein the additional synchronization signal measurement window is 0.5 msec or 1.5 msec.

* * * * *